US011428205B2

(12) United States Patent
Burchardt et al.

(10) Patent No.: US 11,428,205 B2
(45) Date of Patent: Aug. 30, 2022

(54) BEAM FOR A WIND TURBINE BLADE, WIND TURBINE BLADE, WIND TURBINE AND METHOD FOR MANUFACTURING A BEAM FOR A WIND TURBINE BLADE

(71) Applicant: Siemens Gamesa Renewable Energy A/S, Brande (DK)

(72) Inventors: Claus Burchardt, Gistrup (DK); Soeren Randrup Daugaard Henrichsen, Vodskov (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 122 days.

(21) Appl. No.: 16/835,758

(22) Filed: Mar. 31, 2020

(65) Prior Publication Data

US 2020/0318606 A1    Oct. 8, 2020

(30) Foreign Application Priority Data

Apr. 5, 2019  (EP) .................................... 19167475

(51) Int. Cl.
   *F03D 1/06*    (2006.01)
(52) U.S. Cl.
   CPC ........ *F03D 1/0675* (2013.01); *F05B 2240/30* (2013.01)
(58) Field of Classification Search
   CPC ........ F03D 1/0675; F03D 1/065; F03D 13/10; F05B 2240/30; F05B 2280/6003; F05B 2250/5001; Y02P 70/50; Y02E 10/72
   See application file for complete search history.

(56) References Cited

U.S. PATENT DOCUMENTS

| 10,137,542 B2 | 11/2018 | Upton et al. |
| 2009/0068017 A1 | 3/2009 | Rudling |
| 2018/0355842 A1* | 12/2018 | Badger ................ F03D 1/0675 |
| 2019/0145383 A1* | 5/2019 | Christiansen ........... F03D 80/30 416/146 R |
| 2019/0152165 A1* | 5/2019 | Tobin ................. B29D 99/0014 |
| 2019/0195191 A1* | 6/2019 | Girolamo .............. F03D 1/0675 |
| 2019/0264651 A1* | 8/2019 | Wardropper ............ F03D 13/10 |
| 2020/0198264 A1* | 6/2020 | Christiansen ............. B30B 5/02 |
| 2020/0318603 A1* | 10/2020 | Henrichsen ........... F03D 1/0633 |

FOREIGN PATENT DOCUMENTS

| WO | 2006002621 A1 | 1/2006 |
| WO | 2010135737 A1 | 11/2010 |
| WO | 2018091054 A1 | 5/2018 |

OTHER PUBLICATIONS

European Search Report and Written Opinion of the European Searching Authority dated Oct. 14, 2019 for Application No. 19167475.3.

* cited by examiner

*Primary Examiner* — Aaron R Eastman
(74) *Attorney, Agent, or Firm* — Schmeiser, Olsen & Watts LLP

(57) ABSTRACT

Provided is a beam for a wind turbine blade of a wind turbine, whereby the beam is made from a composite material including a matrix and a reinforcement, the beam having a length in a longitudinal direction of the beam, a width in a width direction of the beam and a thickness in a thickness direction of the beam. The beam includes at least one longitudinal recess arranged in the longitudinal direction of the beam, whereby the at least one longitudinal recess separates the beam into adjacent longitudinal beam portions, whereby the longitudinal recess has the width or the thickness of the beam.

13 Claims, 4 Drawing Sheets

A-A

A-A

A-A

A-A

BEAM FOR A WIND TURBINE BLADE, WIND TURBINE BLADE, WIND TURBINE AND METHOD FOR MANUFACTURING A BEAM FOR A WIND TURBINE BLADE

CROSS-REFERENCE TO RELATED APPLICATIONS

This application claims priority to EP Application No. 19167475.3, having a filing date of Apr. 5, 2019, the entire contents of which are hereby incorporated by reference.

FIELD OF TECHNOLOGY

The following is directed to a beam for a wind turbine blade of a wind turbine, whereby the beam is made from a composite material comprising a matrix and a reinforcement, the beam having a length in a longitudinal direction of the beam, a width in a width direction of the beam and a thickness in a thickness direction of the beam. Embodiments of the present invention are further directed to a wind turbine blade for a wind turbine and a wind turbine. Moreover, embodiments of the present invention are directed to a method for manufacturing a beam for a wind turbine blade of a wind turbine.

BACKGROUND

Wind turbine blades must be able to efficiently convert wind into spinning movement of the wind turbine blades, so that energy of the wind can be converted into rotary mechanical movement of a rotor to which the wind turbine blades are attached. It is exemplary, to use materials having a high specific modulus (elastic modulus per mass density of a material), also known as stiffness to weight ratio, in wind turbine blades to deal with the square-cube law governing the scaling of wind turbine blades. Therefore, composite materials such as carbon fiber-reinforced plastic having a high specific modulus are commonly used in wind turbine blades. However, carbon fiber-reinforced plastic, for example, is currently only applied in the main spars of wind turbine blades, where it can minimize flap-wise deflections of the wind turbine blade. That is because carbon fiber-reinforced plastic can be easier draped in the main spars and the distance between opposite beams or spar caps of the main spar is relatively high so that each of the spar cap forms a separate electrical lightning system, whereby the risk of arcing is kept low. Moreover, in other parts of the wind turbine blades than the main spar, for example at the trailing edge of the wind turbine blade, a high rate of twist is applied onto the wind turbine blade during operation. The current design of beams made from composite materials, in particular those with high stiffness-to-weight-ratio, is not able to deal with such a high rate of twist.

U.S. Pat. No. 10,137,542 B2 relates to a method for making, storing, dispensing, tapering, cutting and assembling preform layers of material to form a spar cap for a wind turbine blade. Rigid strength rods are disposed adjacent to one another within the individual preform layers along a length of the rods. Thereby, the spar cap is flexible and can deal with high rates of twist of the wind turbine blade. However, the method of making such a spar cap is cumbersome and expensive due to the plurality of rods that need to be manufactured and embedded in the preform layers.

SUMMARY

Thus, there is still a need beam for a wind turbine blade of a wind turbine that is able to deal with high rates of twist of the wind turbine blade and a cost-efficient manufacturing method thereof.

The advantages are solved by a beam for a wind turbine blade of a wind turbine, a method for manufacturing a beam for a wind turbine blade of a wind turbine, a wind turbine blade and a wind turbine. Further details unfold from the other claims as well as the description and the drawings. Thereby, the features and details described in connection with the beam apply in connection with the method for manufacturing a beam, the wind turbine blade and the wind turbine and the other way around, so that regarding the disclosure of the individual aspects it is or can be referred to one another.

According to embodiments of the invention, the problem is solved by a beam for a wind turbine blade of a wind turbine, whereby the beam is made from a composite material comprising a matrix and a reinforcement, the beam having a length in a longitudinal direction of the beam, a width in a width direction of the beam and a thickness in a thickness direction of the beam, whereby the beam comprises at least one longitudinal recess arranged in the longitudinal direction of the beam, whereby the at least one longitudinal recess separates the beam into adjacent longitudinal beam portions, whereby the longitudinal recess has the width or the thickness of the beam.

The beam according to embodiments of the invention may be used in any technical application, the application being a wind turbine blade of a wind turbine. The beam according to embodiments of the invention is very flexible due to the at least one longitudinal recess and thereby has high twist capabilities, meaning that it can be twisted to a high degree without failure. Further, the beam of embodiments of the invention can be manufactured very cost-efficiently.

The longitudinal recess having the width or the thickness of the beam means that the longitudinal recess is provided along the entire width of the beam or the entire thickness of the beam. In other words, the longitudinal recess has open sides towards opposite surfaces of the beam, the opposite surfaces of the beam being arranged orthogonally to the width direction of the beam or the thickness direction of the beam. In particular, at least one of the at least one longitudinal recess has a length shorter than the length of the beam. In other words, the longitudinal beam portions are connected to one another by unrecessed sections of the beam, where no longitudinal recess is provided. In particular, the unrecessed sections are provided at both ends of the longitudinal beam. The at least one longitudinal recess is arranged at a middle of the length of the beam. At least one of the at least one longitudinal recess may have a planar shape. At least one of the at least one longitudinal recess may be designed as a cutout from the beam. At least one of the at least one longitudinal recess may have a height, which is defined as the distance between adjacent longitudinal beam portions, of 1 mm to 1000 mm, in particular 2 mm to 200 mm and more particularly 5 mm to 50 mm.

In particular, the longitudinal beam portions have a length greater than a width and a thickness of the longitudinal beam portions. The longitudinal beam portions may have a planar shape. The longitudinal beam portions may have a rectangular cross section. The longitudinal beam portions may be designed as longitudinal beam straps.

The beam comprises at least two longitudinal recess arranged in the longitudinal direction of the beam, whereby the at least two longitudinal recesses separate the beam into adjacent longitudinal beam portions. At least two of the at least two longitudinal recess and all longitudinal recesses are arranged parallel to each other in the longitudinal direction of the beam. Thereby, there are at least three parallel adjacent longitudinal beam portions, whereby the twist capabilities are further increased. The beam comprises at least three longitudinal recesses arranged in the longitudinal direction of the beam, whereby the at least three longitudinal recesses separate the beam into adjacent longitudinal beam portions. It is further possible that the amount of longitudinal recesses is in the range of 1 to 30, 2 to 20 and 3 to 10.

In an embodiment of the invention, the reinforcement of the composite material comprises unidirectional fibers arranged in the longitudinal direction of the beam. In particular, the reinforcement of the composite material is a plurality of unidirectional fibers. The stiffness of the beam is thereby maintained even though it comprises the at least one longitudinal recess, because the at least one longitudinal recess does not transversely cut fibers of the reinforcement. Thus, the unidirectional fibers run along or parallel to the at least one longitudinal recess of the beam.

In a further embodiment of the invention, the composite material is a fiber-reinforced plastic, in particular a carbon fiber-reinforced plastic. Fiber-reinforced plastics, in particular carbon fiber-reinforced plastic, have a particularly high stiffness-to-weight ratio and are therefore used where high loads are applied to the beam and the beam is thereby twisted. Further fiber-reinforced plastics for use in the beam may be glass fiber-reinforced plastic and aramid fiber-reinforced plastic, for example. In a carbon fiber-reinforced plastic, carbon fibers are the reinforcement and a polymer resin, such as epoxy, is the matrix. A carbon fiber-reinforced plastic may comprise further fibers such as glass fibers or aramid fibers as reinforcement. However, it is exemplary that the carbon fiber-reinforced plastic comprises predominantly carbon fibers as reinforcement. Alternatively, as the composite material of the beam, composite wood, ceramic matrix composite or a metal matrix composite may be used.

In another embodiment of the invention, the beam is made from at least one pultruded element. The beam may further be made from at least two pultruded elements, which are connected, in particularly adhered, to each other. The connection may be established by resin molding, for example. The at least two pultruded elements may be arranged on top or next to each other. In this case, the longitudinal recess may be provided in both pultruded elements as one longitudinal recess. The beam may moreover be made from at least four pultruded elements, which are connected to each other. Two of the at least four pultruded elements may be arranged next to each other with each one of the other two of the at least four pultruded elements arranged on top of each one of the two of the at least four pultruded elements. In this case, the longitudinal recess may be provided in at least two pultruded elements as one longitudinal recess.

In yet a further embodiment of the invention, at least one of the at least one longitudinal recess has a length of one of at least 20%, 30% and 40% of the length of the beam. Moreover, at least one the at least one longitudinal recess has a length of 20% to 95%, 20% to 90% or 25% to 80% of the length of the beam. Thereby, the beam is provided with high twist capabilities along a large length of the beam while still providing sufficient structural integrity and stiffness of the beam.

In another embodiment, at least one of the at least one longitudinal recess is provided at a distance of at least 20%, in particular at least 30% of the length of the beam from a first end and/or a second end of the beam. Thereby, the beam is provided with unrecessed portions, by which a sufficient structural integrity and stiffness of the beam is achieved.

In yet another p embodiment of the invention, longitudinal beam portions are electrically connected to each other by at least one electrically conductive element. This prevents the beam from damage in case of a lightning strike, because the current from the lightning strike is passed from one longitudinal beam portion to another one by means of the electrically conductive element instead of arcing in the longitudinal recess between adjacent longitudinal beam portions.

The electrically conductive element is wrapped around the beam. Thereby, the electrical connection between the longitudinal beam portions, especially when there are more than two longitudinal beam portions, is facilitated in a cost-efficient manner. The electrically conductive element may have a sheet structure and may be flexible. In particular, the electrically conductive element may be wrapped partially, especially around 50% to 70% of the circumference of the beam, or entirely around the beam, in particular the circumference of the beam.

The electrically conductive element is a carbon fiber roving or a copper mesh. Thereby, a high electrical conductivity is provided and an easy attachment to the longitudinal beam portions is facilitated.

According to a second aspect of embodiments of the invention, there is a method for manufacturing a beam for a wind turbine blade of a wind turbine, whereby the beam is made from a composite material comprising a matrix and a reinforcement, the beam having a length in a longitudinal direction of the beam, a width in a width direction of the beam and a thickness in a thickness direction of the beam, the method comprising the step of cutting, in particular cutting out, at least one longitudinal recess in the longitudinal direction of the beam, so that the at least one longitudinal recess separates the beam into adjacent longitudinal beam portions and the longitudinal recess has the width or the thickness of the beam.

According to a third aspect of embodiments of the invention, there is a wind turbine blade of a wind turbine, the wind turbine blade comprising a shell and a spar having at least one spar cap, whereby at least one of the at least one spar cap comprises the beam.

In a embodiment of the invention, the at least one of the at least one spar cap comprising the beam is arranged at a trailing edge of the wind turbine blade. This is particularly advantageous because high twisting occurs at the trailing edge of the wind turbine blade in the operation of the wind turbine. It has been found, that the twisting capabilities of the wind turbine blade according to embodiments of the invention can thereby by significantly increased.

According to a fourth aspect of embodiments of the invention, there is a wind turbine comprising a wind turbine blade according to embodiments of the invention.

BRIEF DESCRIPTION

Some of the embodiments will be described in detail, with reference to the following figures, wherein like designations denote like members, wherein.

Same objects in FIGS. 1 to 7 are denominated with the same reference number. If there is more than one object of the same kind in one of the figures, the objects are numbered in ascending order with the ascending number of the object being separated from its reference number by a dot.

BRIEF DESCRIPTION

Figure 1:
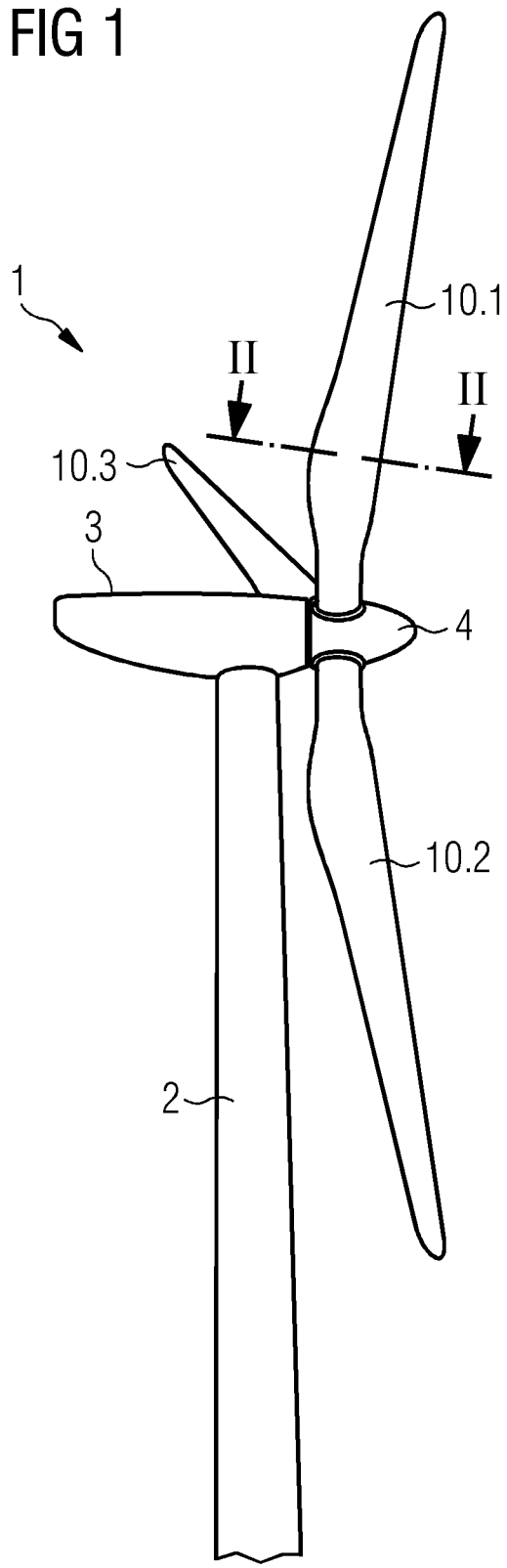
FIG. 1 shows a side view on an embodiment of a wind turbine according to the invention.

FIG. 1 is a side view on an embodiment of a wind turbine 1 according to embodiments of the invention. The wind turbine 1 is provided with three wind turbine blades 10.1, 10.2, 10.3 attached to a hub 4 of the wind turbine 1, which is connected to a nacelle 3 of the wind turbine 1, the nacelle 3 being supported on a mast 2 of the wind turbine 1.

Figure 2:
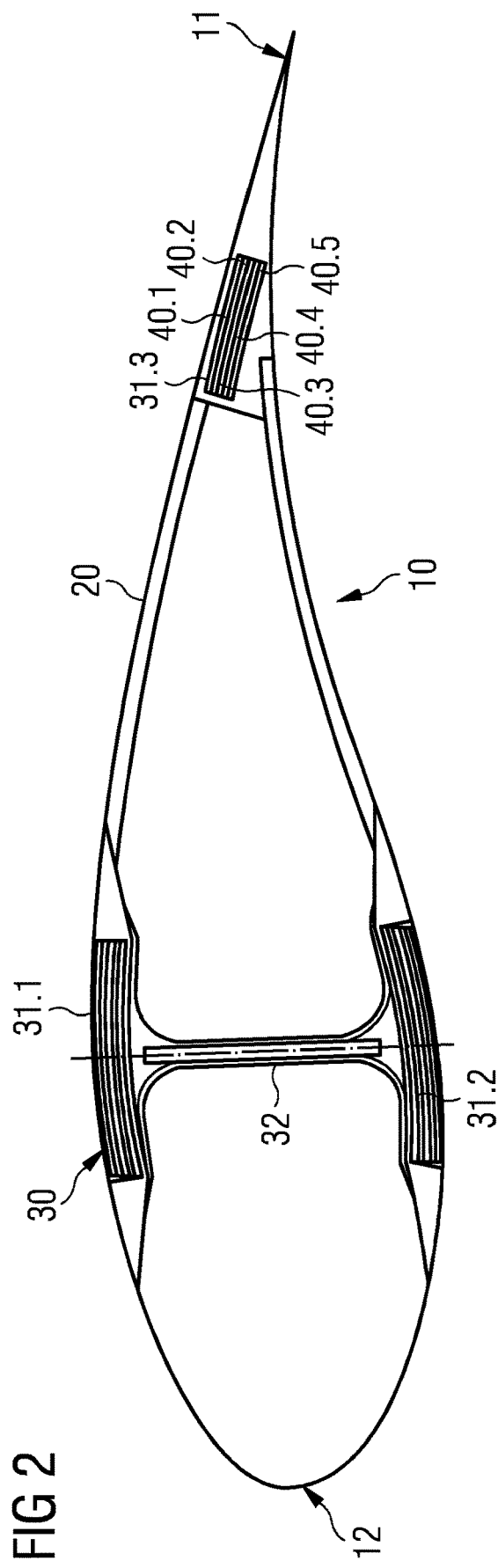
FIG. 2 shows a sectional view along a transversal plane of an embodiment of a wind turbine blade according to the invention and of the wind turbine of FIG. 1.

FIG. 2 is a sectional view along the transversal plane of line I-I depicted in FIG. 1 of the wind turbine blade 10.1 of the wind turbine 1 of FIG. 1. The wind turbine blade 10 has a trailing edge 11 and a leading edge 12. The wind turbine blade 10.1 comprises a shell 20 and a spar 30. The spar 30 comprises three spar caps 31.1, 31.2, 31.3. The two spar caps 31.1, 31.2 face each other and are connected to one another by means of a spar web 32. The spar cap 31.3 is arranged at the trailing edge 11 of the wind turbine blade 10. In this particular embodiment, the spar cap 31.3 comprises four beams 40.1, 40.2, 40.3, 40.4. However, any number of beams 40 can be provided in the spar cap 31.3. Moreover, the spar caps 31.1, 31.2 may be provided with beams 40 according to embodiments of the invention.

Figure 3:
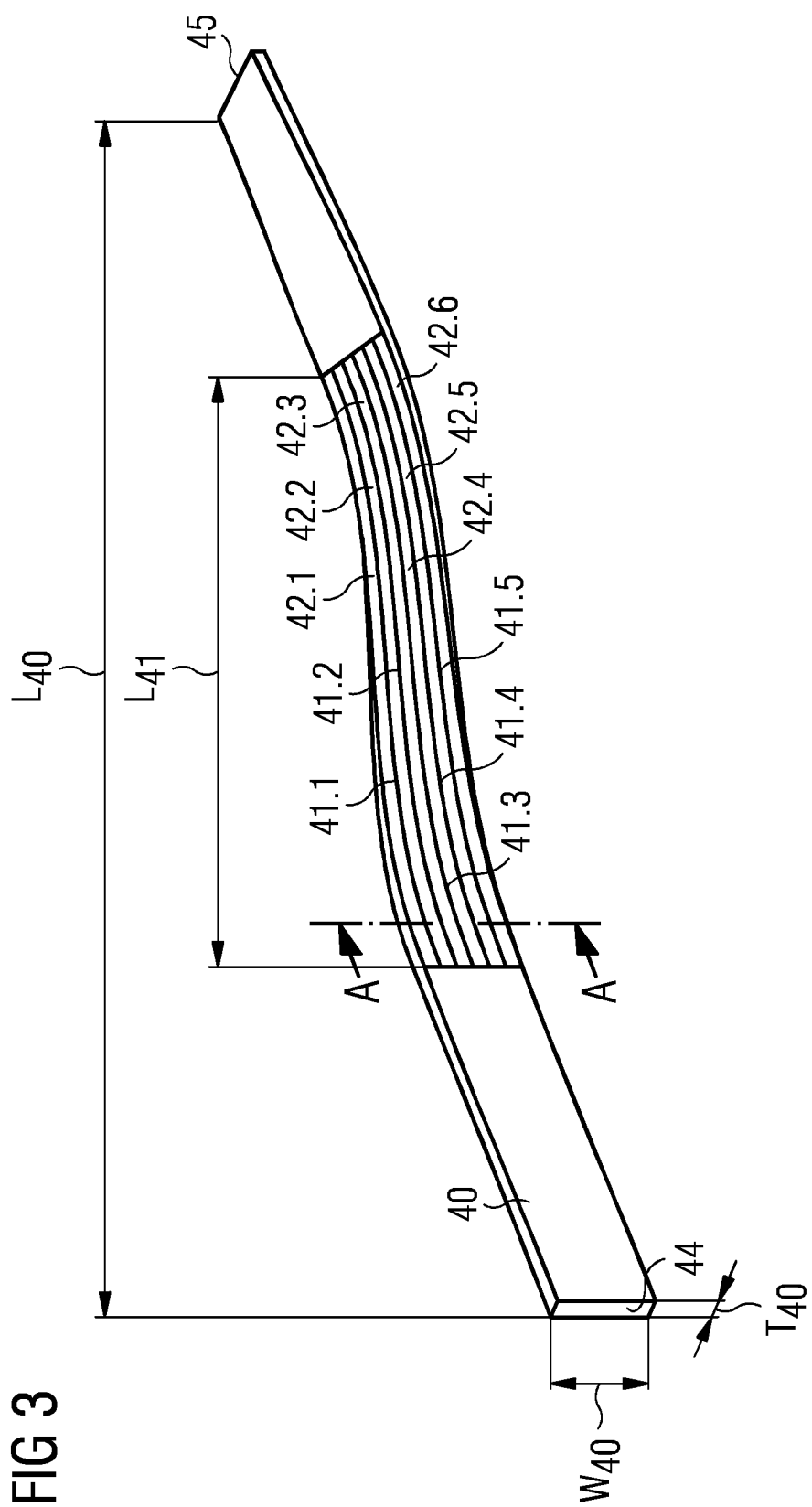
FIG. 3 shows a side view on an embodiment of an embodiment beam according to the invention and of the wind turbine blade of FIG. 2.

FIG. 3 is a side view on the beam 40.1 of FIG. 2. The beam has a length $L_{40}$ in the longitudinal direction of the beam 40, a width $W_{40}$ in the width direction of the beam 40 and a thickness $T_{40}$ in the thickness direction of the beam 40. In this particular embodiment, the beam 40 is a pultruded element made from carbon fiber-reinforced plastic. Five longitudinal recesses 41.1, 41.2, 41.3, 41.4, 41.5 are arranged parallel to one another in the longitudinal direction of the beam 40, whereby the longitudinal recesses 41.1, 41.2, 41.3, 41.4, 41.5 separate the beam 40 into six adjacent longitudinal beam portions 42.1, 42.2, 42.3, 42.4, 42.5, 42.6. The longitudinal recesses 41.1, 41.2, 41.3, 41.4, 41.5 and the longitudinal beam portions 42.1, 42.2, 42.3, 42.4, 42.5, 42.6 have the thickness $T_{40}$ of the beam. The longitudinal recesses 41.1, 41.2, 41.3, 41.4, 41.5 are arranged in a recessed portion having the length $L_{41}$ of the beam 40. The length $L_{41}$ is 50% of the length $L_{40}$ of the beam 40 in this particular embodiment. The longitudinal beam portions 42.1, 42.2, 42.3, 42.4, 42.5, 42.6 are connected to each other by means of unrecessed portions arranged towards a first end 44 and towards a second end 45 of the beam 40, respectively. Both unrecessed portions have a length of 25% of the length $L_{40}$ of the beam 40 in this particular embodiment. Thereby, the longitudinal recesses 41.1, 41.2, 41.3, 41.4, 41.5 are provided at a distance of 25% of the length $L_{40}$ of the beam 40 from the first end 44 and the second end 45 of the beam 40.

Figure 4:
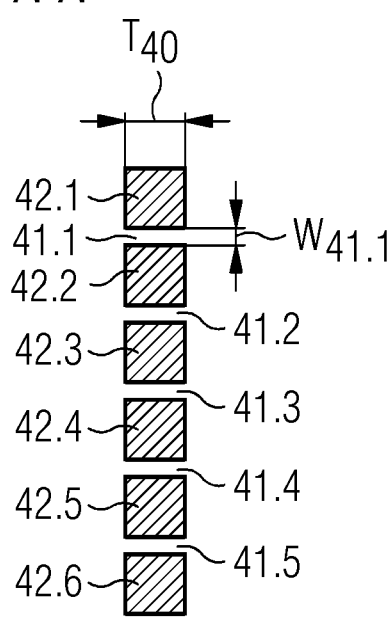
FIG. 4 shows a sectional view along line A-A of a first embodiment of the beam of FIG. 3.

FIG. 4 is a sectional view along line A-A of the beam 40 of FIG. 3. Here, the longitudinal recesses 41.1, 41.2, 41.3, 41.4, 41.5 separating the longitudinal beam portions 42.1, 42.2, 42.3, 42.4, 42.5, 42.6 from one another can clearly be seen. The longitudinal recesses 41.1, 41.2, 41.3, 41.4, 41.5 and the longitudinal beam portions 42.1, 42.2, 42.3, 42.4, 42.5, 42.6 have the thickness $T_{40}$, which is the thickness of the beam 40. The longitudinal recesses 41.1, 41.2, 41.3, 41.4, 41.5 have a height of $W_{41.1}$, which is provided in the width direction $W_{40}$ of the beam 40 and create a space or distance between adjacent longitudinal beam portions 42.1, 42.2, 42.3, 42.4, 42.5, 42.6.

Figure 5:
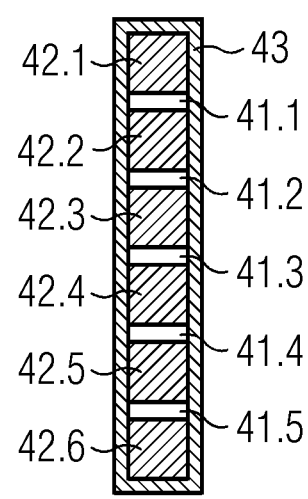
FIG. 5 shows a sectional view of a second embodiment of a beam according to the invention.

FIG. 5 is a sectional view of a second embodiment of a beam 40 according to embodiments of the invention. Here, an electrically conductive material 43 is wrapped around the beam 40, in particularly around the entire circumference of the beam 40. The electrically conductive material 43 is designed as a sheet material and is flexible in this particular embodiment. Such a wrap is a particularly easy way of electrically connecting the longitudinal beam portions 42.1, 42.2, 42.3, 42.4, 42.5, 42.6.

Figure 6:
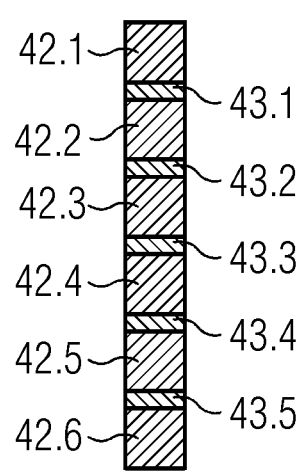
FIG. 6 shows a sectional view of a third embodiment of a beam according to the invention.

FIG. 6 is a sectional view of a third embodiment of a beam 40 according to embodiments of the invention. Here, five separate pads of electrically conductive material 43.1, 43.2, 43.3, 43.4, 43.5 are provided in each of the longitudinal recesses 41.1, 41.2, 41.3, 41.4, 41.5. In particular, these pads of electrically conductive material 43.1, 43.2, 43.3, 43.4, 43.5 are flexible, so that the beam 40 is kept flexible and with its high twisting capabilities at its recessed portion.

Figure 7:
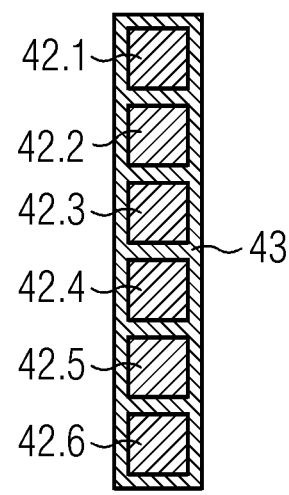
FIG. 7 shows a sectional view of a fourth embodiment of abeam according to the invention.

FIG. 7 is a sectional view of a fourth embodiment of a beam 40 according to embodiments of the invention. Here, the electrically conductive material 43 is wrapped around the beam 40, in particular around the entire circumference of the beam 40, and additionally provided in each of the longitudinal recesses 41.1, 41.2, 41.3, 41.4, 41.5. Thereby, a large surface area of the electrically conductive material 43 is provided, by means of which the current from a lightning strike intercepted by the beam 40 can be passed on between the longitudinal beam portions 42.1, 42.2, 42.3, 42.4, 42.5, 42.6.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A beam for a wind turbine blade of a wind turbine, wherein the beam is made from a composite material comprising a matrix and a reinforcement, the beam having a length in a longitudinal direction of the beam, a width in a width direction of the beam and a thickness in a thickness direction of the beam, wherein the beam includes at least one longitudinal recess arranged in the longitudinal direction of the beam, wherein the at least one longitudinal recess separates the beam into adjacent longitudinal beam portions, wherein the at least one longitudinal recess has the width or the thickness of the beam, wherein the longitudinal beam portions are connected to one another by unrecessed sections of the beam where the at least one longitudinal recess is not provided, and wherein the unrecessed sections are provided at both ends of the beam.

2. The beam according to claim 1,
wherein the reinforcement of the composite material comprises unidirectional fibers arranged in the longitudinal direction of the beam.

3. The beam according to claim 1,
wherein the composite material is a fiber-reinforced plastic.

4. The beam according to claim 1,
wherein the beam is made from at least one pultruded element.

5. The beam according to claim 1,
wherein at least one of the at least one longitudinal recess has a length of at least 20% of the length of the beam.

6. The beam according to claim 1,
wherein at least one of the at least one longitudinal recess is provided at a distance of at least 20% of the length of the beam from a first end and/or a second end of the beam.

7. The beam according to claim 1,
wherein the longitudinal beam portions are electrically connected to each other by at least one electrically conductive element.

8. The beam according to claim 7,
wherein the at least one electrically conductive element is wrapped around the beam.

9. The beam according to claim 7,
wherein the at least one electrically conductive element is a carbon fiber roving or a copper mesh.

10. A wind turbine blade of a wind turbine, the wind turbine blade comprising a shell and a spar having at least one spar cap, wherein at least one of the at least one spar cap comprises the beam according to claim 1.

11. The wind turbine blade according to claim 10,
wherein the at least one of the at least one spar cap comprising the beam is arranged at a trailing edge of the wind turbine blade.

12. A wind turbine comprising the wind turbine blade of claim 10.

13. A method for manufacturing a beam for a wind turbine blade of a wind turbine, wherein the beam is made from a composite material comprising a matrix and a reinforcement, the beam having a length in a longitudinal direction of the beam, a width in a width direction of the beam, and a thickness in a thickness direction of the beam, the method comprising the step of cutting at least one longitudinal recess in the longitudinal direction of the beam, so that the at least one longitudinal recess separates the beam into adjacent longitudinal beam portions and the at least one longitudinal recess has the width or the thickness of the beam and so that the longitudinal beam portions are connected to one another by unrecessed sections of the beam where the at least one longitudinal recess is not provided, and wherein the unrecessed sections are provided at both ends of the beam.

* * * * *